G. H. LEE.
INCUBATOR.
APPLICATION FILED AUG. 18, 1911.
1,060,552.
Patented Apr. 29, 1913.
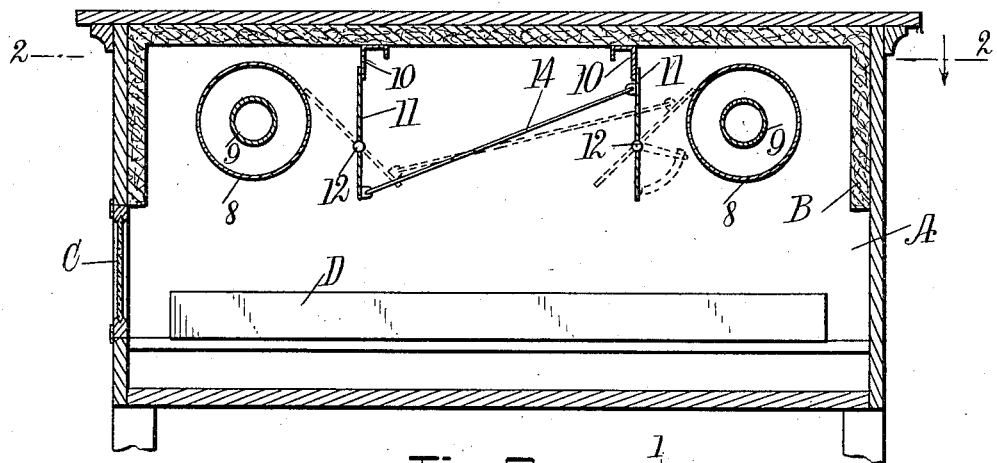
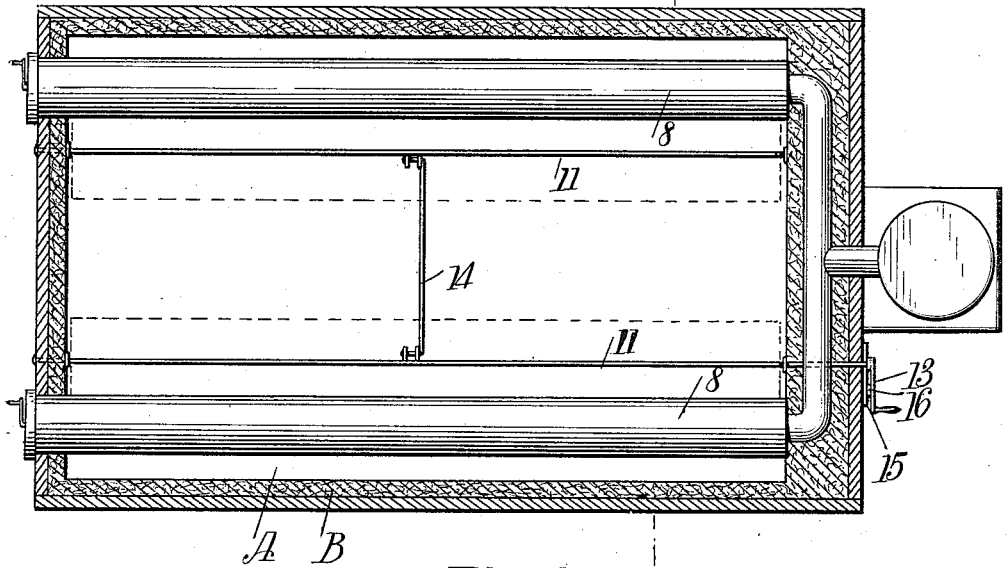
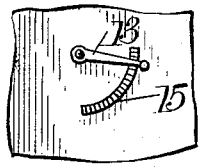
WITNESSES
INVENTOR
George H. Lee
BY Munn & Co
ATTORNEYS

UNITED STATES PATENT OFFICE.

GEORGE HOWARD LEE, OF OMAHA, NEBRASKA.

INCUBATOR.

1,060,552.   Specification of Letters Patent.   Patented Apr. 29, 1913.

Application filed August 18, 1911. Serial No. 644,728.

*To all whom it may concern:*

Be it known that I, GEORGE H. LEE, a citizen of the United States, and a resident of Omaha, in the county of Douglas and State of Nebraska, have invented a new and Improved Incubator, of which the following is a full, clear, and exact description.

Among the principal objects which the present invention has in view are: to provide means for wholly or partially excluding and admitting heated air to certain and various sections of the incubating chamber; and to provide manually operable means for adjusting the distributers to equalize or vary at will the temperature throughout the incubating chamber.

One embodiment of the present invention is disclosed in the structure illustrated in the accompanying drawings, in which like characters of reference denote corresponding parts in all the views, and in which—

Figure 1 is a vertical cross section of an incubator constructed and arranged in accordance with the present invention, the section being taken on the line 1—1 in Fig. 2; Fig. 2 is a horizontal section taken on the line 2—2 in Fig. 1; and Fig. 3 is a detail view showing the crank handle for adjusting the heating system of the incubator.

As seen in the accompanying drawings, the incubating chamber A is provided with an upper space for holding a heated stratum of air. For this purpose the upper portion of the structure of the incubator is provided with a heat insulating pad B, the sides whereof are extended to the level of the top opening of the door C. The heat is imparted to the stratum of air thus referred to by means of drums 8, 8. The drums 8, 8 are supplied with heated air by means of distributing pipes 9. As shown particularly in Fig. 1 of the drawings the drums 8, 8 are extended across the chamber A and above the lower end of the insulating pad B. The insulating pad B is partly supported by means of channeled irons 10. The irons 10 are provided with depending flanges to afford a rest for the swinging partitions 11, 11. The partitions 11, 11 are provided with suitable shafts 12, 12 which extend lengthwise the said incubating chamber, and are mounted in suitable bearings formed in the walls thereof. One of the shafts 12 is extended through the said walls and is provided with a crank handle 13 fixedly connected thereto. The two partitions 11, 11 are connected by means of a rod 14, which rod is pivotally connected with the opposite partitions, as shown in Figs. 1 and 2. The object of the rod 14 is to rock in opposite directions the partitions 11, 11 when the one or other of said partitions is moved. The rocking of one of the partitions is accomplished by turning the handle 13. The handle 13, as shown in Fig. 3 of the drawings, is held in position by means of a serrated or toothed quadrant plate 15, the said plate 15 being permanently mounted on the side of the incubator structure. To hold the handle 13 in position the same may be constructed of resilient material and provided with a detent tooth 16, as shown in Fig. 2, which tooth, by engaging the teeth of the quadrant plate 15 holds the handle 13 and the shafts 12 and partitions 11 connected therewith fixedly in adjusted positions.

It is obvious that when the partitions 11, 11 are disposed as shown in Fig. 1 of the drawings the heated air of the chamber A is excluded from the space between the two partitions 11. The space between the partitions 11 being disposed above the middle of the tray D the eggs there located are subjected to a less degree of heat than are the eggs disposed below the drums 8. In incubating eggs it is found that the eggs in the center of the tray, because of their protected position, have more heat than the eggs at the sides of the tray. It will be understood that by closing the partitions 11, 11 in the position shown in Fig. 1 the heat above the eggs in the center of the tray may be materially reduced, and the heat at the forward and rear edges of the tray be proportionately increased.

By arranging the partitions 11, 11 in the positions shown in dotted lines in Fig. 1, it will be seen that the central portion of the chamber is open to freely receive the heat from the drums 8, 8, and that the whole of the upper stratum of the chamber A is heated in equal degree. In said Fig. 1 I have shown the extremes of the positions. It will be understood that neither extreme is desired, and that perfect operation of the incubator is secured by the adjustment of the heat to the ideal requirements. This is attained when the partitions 11 are adjusted to limit to similar extent the passage of heat to the median section of the incubating chamber from the sections containing the drums 8, 8, it being the purpose to equalize the heat among the eggs on the tray D by lessening the direct radiation of the heat from the upper stratum of heated air to the eggs in the middle of the tray. When the desired distribution, as indicated in the usual manner by thermometers on the tray D, is attained, the handle 13 is permitted to remain in fixed locked position on the plate 15.

Having thus described my invention, what I claim as new and desire to secure by Letters Patent is:—

1. An incubator, comprising a tray-heating chamber; a plurality of adjustable partitions disposed across said chamber, adjacent the top thereof to form a plurality of open-bottomed sections; two heating drums, one disposed in each of said chambers adjacent the outside wall of said sections, and means for manually adjusting said partitions to form a passage between the same and the top of said chamber.

2. An incubator, comprising an egg-tray chamber; a plurality of partitions pivotally mounted in said chamber adjacent the top of said chamber and depending therefrom to divide the upper space of said chamber into more than two open-bottomed sections, means external said chamber for rocking said partitions to open or close passages between the same and the top of said chamber; and heating means disposed within the sections adjacent the side walls of said chamber, above the lower edge of said partitions.

3. An incubator, comprising an egg-tray chamber; a plurality of partitions normally depending from the top of said chamber, to form in the upper portion of said chamber a plurality of parallel open-bottomed sections, said partitions being pivotally mounted in said chamber; two heating drums disposed lengthwise of said chamber in the sections adjacent the side walls of said chamber; and means external said incubator for rotating said partitions.

In testimony whereof I have signed my name to this specification in the presence of two subscribing witnesses.

GEORGE HOWARD LEE.

Witnesses:
H. ROWLEY,
A. A. KEENAN.

---

Copies of this patent may be obtained for five cents each, by addressing the "Commissioner of Patents, Washington, D. C."